Oct. 23, 1962  G. H. KIMBALL  3,059,904
FURNITURE MOVER
Filed March 6, 1961

INVENTOR.
GEORGE H. KIMBALL
BY
Kimmel & Crowell
ATTORNEYS

United States Patent Office 3,059,904
Patented Oct. 23, 1962

3,059,904
FURNITURE MOVER
George H. Kimball, 2142 SE. 53rd Ave., Portland, Oreg.
Filed Mar. 6, 1961, Ser. No. 93,780
1 Claim. (Cl. 254—10)

This invention relates to a device for moving furniture or the like and has particular applicability to household use.

An important object of this invention is the provision of a relatively small light weight lift truck or dolly by means of which a housewife or other individual may lift and move relatively heavy articles of furniture with a minimum of effort and difficulty, thus saving time and physical effort and reducing the possibility of physical injury due to strain or over exertion.

An additional object of the invention is the provision of a device of this character provided with a caster wheel for simple steering and a lifting device employing a lever whereby a heavy article may be readily lifted from the floor.

A further object of the invention is the provision of such a device which is sturdy and durable in construction, reliable and efficient in operation, relatively simple and inexpensive to manufacture, such which when not in use, may be readily stored in a minimum space.

Other objects will in part be obvious and in part be pointed out as the description of the invention proceeds, and shown in the accompanying drawing wherein.

Similar reference characters refer to similar parts throughout the several views of the drawing.

Figure 1:
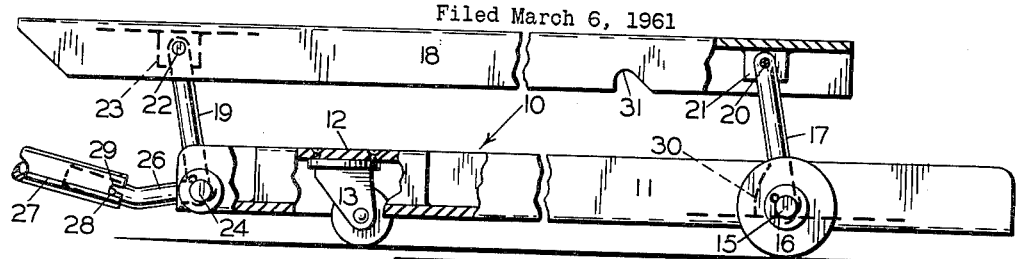
FIGURE 1 is a side elevational view of one form of device, constructed in accordance with the instant invention, with the elevating members raised, partially broken away.
Figure 2:
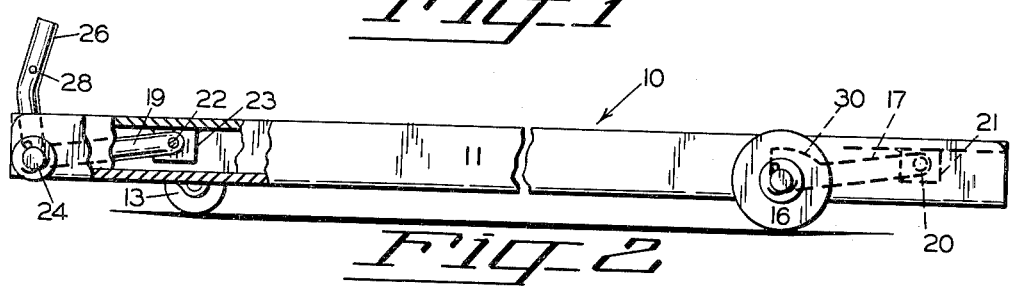
FIGURE 2 is a side elevational view of the device similar to FIG. 1 with the elevating members, shown in broken line, lowered and seated within the body.
Figure 3:
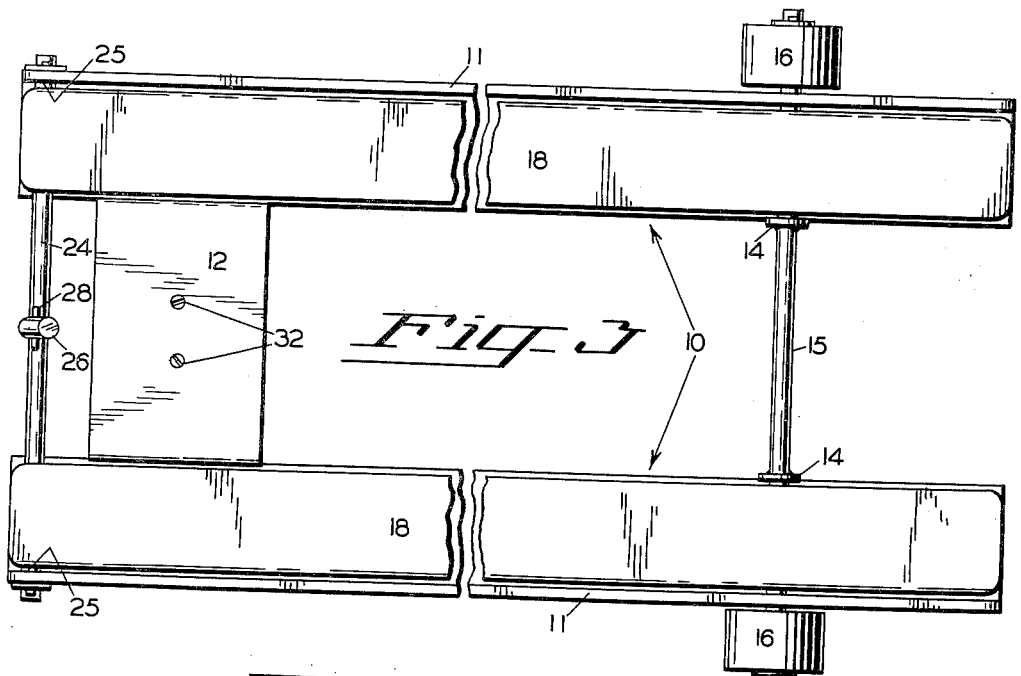
FIGURE 3 is a top plan view, with the elevating members lowered.
Figure 4:
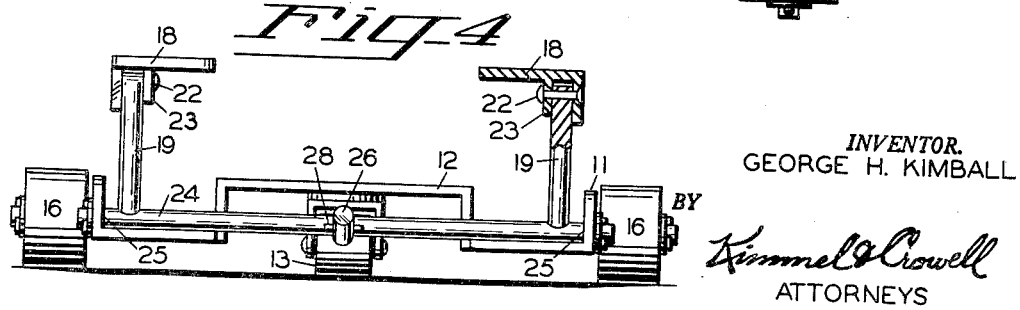
FIGURE 4 is a front end view of the device, and partially in section.

The device consists of a body, generally indicated by the numeral 10, composed of two longitudinal angle members 11 suitably spaced by a front wheel mounting plate 12, or channel, used to suspend and support the front swivel wheel or caster 13. At the opposite end, the angles are spaced by the use of collars 14 fixedly mounted on the rear axle 15 which has, on each end, rear supporting wheels 16. In addition to being used as an axle for the rear wheels the axle 15 has fixedly mounted thereon two rear lifting arms 17 used to cause elevating members 18 to rise when the elevating members are moved forward by the action of the front lifting arms 19, to be described later. Rear lifting arms 17 are pivotally mounted on the elevating members 18 by pivot pins or bolts 20 within rear U-shaped mounts 21. The activating or front lifting arms 19 are likewise pivotally secured to the elevator members by pivot pins 22 within front U-shaped mounts 23. The lifting arms are fixedly secured to a shaft 24 which is free to revolve within two corresponding bores 25 which are located on the leading ends of the angles 11, as best shown in FIG. 4. Fixedly mounted and integral with shaft 24 is a stub-shaft 26 used to operate the lifting mechanism, the stub-shaft being bent, as best illustrated in FIGS. 1 and 2. Over stub-shaft 26 is fitted an operating handle 27 shown in FIG. 1.

In the use and operation of the device the operating handle 27 is first slipped over the stub-shaft 26 and secured thereon by the lugs 28 and catching slots 29 on the operating handle. Operating handle 27 is now used to guide this device beneath the piece of furniture to be moved, and when the device is properly located, handle 27 is used to elevate elevating members 18 by using its full mechanical advantage. When handle 27 moves downwardly, carrying with it stub-shaft 26, the stub-shaft revolves the shaft 24, which, because it is integral with the front lifting arms 19, causes these arms to lift the elevating members 18 from within the angles 11. Simultaneous with lifting the elevating members, the front lifting arms 19 exert a forward pull on the elevating members, which in turn causes the rear lifting arms 17 to move forward, thus lifting the rear end of the elevating members. When fully raised, all the lifting arms are forced forward past their center of arcs and stopped in this position by stop members 30, integral with rear lifting arms 17, stop members 30 resting on the floor of angle members 11, as best shown in FIG. 1. When elevating members 18 are nestled within the angle members 11, cut-away portions or notches 31 allow the rear axle 15 to fit within them so as to allow the elevating members to lie flat within the angles 11.

The amount of lift is only that rise as is necessary to clear the floor. Naturally, modifications of this device may be necessary to accommodate various heights of furniture. This is done by providing different sized rear wheels 16 and front caster 13. The caster is readily removable, since it is merely mounted by two bolts 32.

As can readily be seen, there is herein provided a device to handle the various needs of a housewife in moving furniture and the like about the house for short distances.

As many embodiments may be made of this inventive concept, and as many modifications may be made in the embodiment hereinbefore shown and described, it is to be understood that all matter herein is to be interpreted merely as illustrative, and not in a limiting sense.

I claim:

A furniture moving device comprising a body including a pair of longitudinally extending angle members connected in spaced parallel relation, a rear axle secured to said angle members, supporting wheels rotatably mounted on each end of said axle, a revolvable shaft mounted in said angle members adjacent the leading ends thereof, a first pair of lifting arms each fixed to said rear axle inwardly from the ends thereof, a second pair of lifting arms each fixed to said revolvable shaft inwardly from the ends thereof, a pair of elevating members disposed in overlying relation to said angle members, one each of said first and second pairs of lifting arms pivotally secured to each of said pair of elevating members, a centrally disposed stub shaft extending substantially perpendicularly from said revolvable shaft, an elongated handle removably engageable with the free end of said stub shaft, said stub shaft movable by said handle to revolve said revolvable shaft which through said lifting arms fixed thereto and to said rear axle simultaneously elevate said elevating members, and a caster wheel mounted between said angle members inwardly of the leading ends thereof.

References Cited in the file of this patent
UNITED STATES PATENTS 2,121,764   Quayle _____ June 21, 1938
2,502,285   Smith et al _____ Mar. 28, 1950